(12) United States Patent
Nishikawa (10) Patent No.: US 10,058,944 B2
(45) Date of Patent: Aug. 28, 2018

(54) WIRE ELECTRIC DISCHARGE MACHINE DETERMINING WHETHER OR NOT ELECTRICAL DISCHARGE MACHINING OF WORKPIECE CAN BE PERFORMED

(71) Applicant: FANUC Corporation, Yamanashi (JP)

(72) Inventor: Ryou Nishikawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 277 days.

(21) Appl. No.: 14/822,222

(22) Filed: Aug. 10, 2015

(65) Prior Publication Data

US 2016/0039025 A1 Feb. 11, 2016

(30) Foreign Application Priority Data

Aug. 11, 2014 (JP) ................................. 2014-163797

(51) Int. Cl.
| | | |
|---|---|---|
| B23H 1/02 | (2006.01) | |
| B23H 7/02 | (2006.01) | |
| B23H 7/10 | (2006.01) | |
| B23H 7/20 | (2006.01) | |

(52) U.S. Cl.
CPC .............. *B23H 1/024* (2013.01); *B23H 7/02* (2013.01); *B23H 7/102* (2013.01); *B23H 7/104* (2013.01); *B23H 7/20* (2013.01); *B23H 2500/20* (2013.01)

(58) Field of Classification Search
CPC .......... B23H 1/024; B23H 7/02; B23H 7/102; B23H 7/104; B23H 7/20; B23H 2500/20
See application file for complete search history.

(56) References Cited

U.S. PATENT DOCUMENTS

| | | | | |
|---|---|---|---|---|
| 4,689,462 A | * | 8/1987 | Goto ........................ | B23H 7/02 204/206 |
| 5,039,834 A | * | 8/1991 | Obara .................... | B23H 7/104 219/69.12 |
| 6,610,956 B1 | | 8/2003 | Yasuda | |
| 2002/0060528 A1 | * | 5/2002 | Murai ...................... | B23H 7/04 315/291 |

(Continued)

FOREIGN PATENT DOCUMENTS

| | | |
|---|---|---|
| CN | 1327403 A | 12/2001 |
| CN | 1476958 A | 2/2004 |

(Continued)

OTHER PUBLICATIONS

Extended European Search Report in EP Application No. 15176850.4 dated Jan. 8, 2016.

(Continued)

*Primary Examiner* — Geoffrey S Evans
(74) *Attorney, Agent, or Firm* — Hauptman Ham, LLP (57) ABSTRACT

A wire electric discharge machine, configured to determine whether or not electrical discharge machining of a workpiece can be performed, includes a determination unit for determining that wire electrical discharge machining of the workpiece can be performed when a wire electrode is moved toward the workpiece and a contact detection unit detects contact, and for determining that the wire electrical discharge machining of the workpiece cannot be performed when a breaking detection unit detects the breaking of the wire electrode before the contact detection unit detects the contact.

18 Claims, 8 Drawing Sheets

WHEN X SHAFT AND Y SHAFT ARE MOVED (56) References Cited

U.S. PATENT DOCUMENTS

| | | |
|---|---|---|
| 2004/0030440 A1 | 2/2004 | Murai et al. |
| 2009/0101627 A1 | 4/2009 | Kawahara et al. |
| 2009/0120911 A1 | 5/2009 | Kawahara et al. |
| 2009/0152244 A1* | 6/2009 | Kita ................. B23H 1/10 219/69.19 |
| 2010/0038258 A1 | 2/2010 | Lin et al. |
| 2012/0228270 A1* | 9/2012 | Murai ............... B23H 1/022 219/69.13 |
| 2013/0277335 A1 | 10/2013 | Matsunaga et al. |

FOREIGN PATENT DOCUMENTS

| | | | |
|---|---|---|---|
| CN | 101433987 A | | 5/2009 |
| JP | 60-177824 A | | 9/1985 |
| JP | 60-186325 A | | 9/1985 |
| JP | 61-121825 A | | 6/1986 |
| JP | 62-74531 A | | 4/1987 |
| JP | 63-109915 A | | 5/1988 |
| JP | 02-116421 A | * | 5/1990 |
| JP | 3-123621 U | | 12/1991 |
| JP | 8-197335 A | | 8/1996 |
| JP | 11-221718 A | | 8/1999 |
| JP | H11-320258 A | | 11/1999 |
| JP | 2013-226612 A | | 11/2013 |
| WO | WO-94/00265 A1 | * | 1/1994 |

OTHER PUBLICATIONS

Decision to Grant a Patent in JP Application No. 2014-163797, dated Jun. 28, 2016.
Office Action in CN Application No. 201510490301.1, dated Jun. 27, 2017.

* cited by examiner

WHEN X SHAFT AND Y SHAFT ARE MOVED

FIG. 3

WHEN U SHAFT AND V SHAFT ARE MOVED

WIRE ELECTRIC DISCHARGE MACHINE DETERMINING WHETHER OR NOT ELECTRICAL DISCHARGE MACHINING OF WORKPIECE CAN BE PERFORMED

RELATED APPLICATIONS

The present application claims priority to Japanese Application Number 2014-163797, filed Aug. 11, 2014, the disclosure of which is hereby incorporated by reference herein in its entirety.

BACKGROUND OF THE INVENTION

1. Field of the Invention

The present invention relates to a wire electric discharge machine, and more particularly, to a wire electric discharge machine having a function to determine whether or not electrical discharge machining of a workpiece can be performed.

2. Description of the Related Art

In recent years, various metal materials have been developed. In the part of the metal materials, there is also a metal material of which electrical conductivity is very low and electrical discharge machining cannot be performed. Meanwhile, materials having high electrical conductivity also have been developed among ceramic materials and organic compound materials that have been treated as insulating materials until now. It is very difficult for a general user to determine whether or not the electrical discharge machining of these materials can be performed at a glance.

In the related art, a user measures a resistance value or electrical conductivity by using a measuring instrument such as a tester in order to determine whether or not the electrical discharge machining of a workpiece as an object can be performed, and determines that the electrical discharge machining of the workpiece can be performed when a resistance value is low or electrical conductivity is high (for example, paragraph [0033] of JP 11-320258 A).

However, since a threshold of a resistance value or electrical conductivity at which electrical discharge machining can be performed varies depending on the characteristics and the like of a power supply of the wire electric discharge machine, there is a case in which wire electrical discharge machining can be performed even though specific resistance is somewhat low. For this reason, it is possible for a skillful user to determine the sensitive threshold, but it is very difficult for a general user to determine the sensitive threshold. Further, since a measuring instrument such as a tester needs to be separately prepared as also disclosed in JP 11-320258 A, there is a problem in that work performed until the start of electrical discharge machining is cumbersome.

SUMMARY OF THE INVENTION

Accordingly, an object of the invention is to propose a wire electric discharge machine that can determine whether or not the electrical discharge machining of a workpiece can be performed.

According to an aspect of the invention, there is provided a wire electric discharge machine configured to determine whether or not electrical discharge machining of a workpiece can be performed and performs wire electrical discharge machining while moving a wire electrode, which is stretched between upper and lower wire guides, relative to a table on which the workpiece is placed. The wire electric discharge machine includes: a contact detection unit for detecting the contact between the wire electrode and the workpiece by applying a predetermined voltage to the wire electrode; a breaking detection unit for detecting the breaking of the wire electrode; a determination unit for determining that wire electrical discharge machining of the workpiece can be performed when the wire electrode is moved toward the workpiece and the contact detection unit detects the contact, and for determining that the wire electrical discharge machining of the workpiece cannot be performed when the breaking detection unit detects the breaking of the wire electrode before the contact detection unit detects the contact; and a display unit for displaying a result of the determination.

According to another aspect of the invention, there is provided a wire electric discharge machine configured to determine whether or not electrical discharge machining of a workpiece can be performed and perform wire electrical discharge machining while moving a wire electrode, which is stretched between upper and lower wire guides, relative to a table on which the workpiece is placed. The wire electric discharge machine includes: a contact detection unit for detecting the contact between the wire electrode and the workpiece by applying a predetermined voltage to the wire electrode; a wire tension detection unit for detecting the tension of the wire electrode; a determination unit for determining that wire electrical discharge machining of the workpiece can be performed when the wire electrode is moved toward the workpiece and the contact detection unit detects the contact, and for determining that the wire electrical discharge machining of the workpiece cannot be performed when the wire tension detection unit detects tension exceeding a predetermined threshold before the contact detection unit detects the contact; and a display unit for displaying a result of the determination.

The contact detection unit may detect the contact between the wire electrode and the workpiece by detecting the change of a potential difference between the wire electrode and the workpiece.

The contact detection unit may detect the contact between the wire electrode and the workpiece by detecting current flowing between the wire electrode and the workpiece.

Since the invention has the above-mentioned structure and whether or not the electrical discharge machining of the workpiece can be performed can be determined on the wire electric discharge machine, a measuring instrument such as a tester is not required. Further, since whether or not machining can be performed is determined on the wire electric discharge machine used in machining, whether or not machining can be performed is easily determined even when a threshold of a resistance value at which electrical discharge machining can be performed is unclear due to a difference in power supply performance or the like of the wire electric discharge machine.

BRIEF DESCRIPTION OF THE DRAWINGS

The above and other objects and features of the invention will become apparent from the following description made with reference to accompanying drawings in which.

DETAILED DESCRIPTION OF THE PREFERRED EMBODIMENTS

Figure 1:
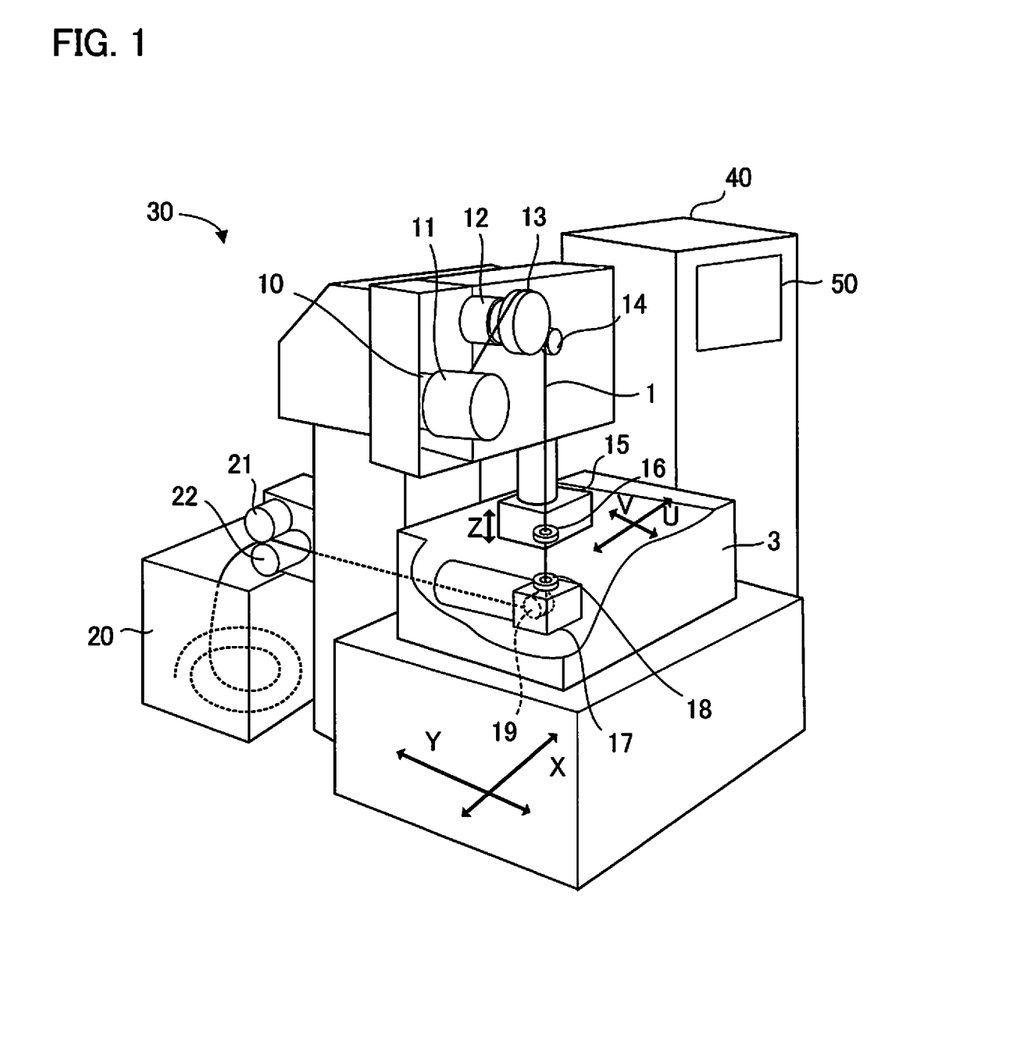
FIG. 1 is a schematic diagram illustrating the structure of a wire electric discharge machine according to an embodiment of the invention.

FIG. 1 is a schematic diagram illustrating the structure of a wire electric discharge machine 30 according to an embodiment of the invention. Predetermined low torque, which is commanded, is applied to a wire bobbin 11, on which a wire electrode 1 is wound, in a direction opposite to a drawing direction of the wire electrode 1 by a sending unit-torque motor 10. The wire electrode 1, which is fed out from the wire bobbin 11, goes through a plurality of guide rollers (not illustrated). Further, tension between a brake roller 13, which is driven by a brake motor 12, and a feed roller 22, which is driven by a wire electrode feed motor (not illustrated), is adjusted by the brake roller 13.

The wire electrode 1 is guided to an upper guide 15 while being interposed between the brake roller 13 and a pinch roller 14; goes through an upper wire guide 16 that is provided on the upper guide 15 and a lower wire guide 18 and a lower guide roller 19 that are provided on a lower guide 17; and is collected in a wire electrode collecting box 20 while being interposed between a pinch roller 21 and the feed roller 22 that is driven by the wire electrode feed motor (not illustrated).

A machining power supply 40 supplies current, which is required to perform electrical discharge machining, to the wire electric discharge machine 30. Further, reference numeral 50 denotes a numerical control device that controls the operations of the wire electric discharge machine 30 and the machining power supply 40 and includes a display unit 51 (not illustrated).

As illustrated in FIG. 1, the wire electric discharge machine 30 includes a Z shaft, an X shaft, a Y shaft, a U shaft, and a V shaft, as drive shafts. The Z shaft is a shaft that is moved parallel with the wire electrode 1, the X shaft and the Y shaft are moved in a plane perpendicular to the wire electrode 1, and the U shaft and the V shaft are moved parallel with the X shaft and the Y shaft to tilt the wire electrode 1. A workpiece 2 (not illustrated), which is an object to be subjected to electrical discharge machining, is placed on a table 5 (not illustrated) installed on a workpiece mount 4 (not illustrated), is disposed between the upper and lower wire guides 16 and 18 in a machining tank 3, and is subjected to electrical discharge machining while the wire electrode 1 is moved relative to the workpiece 2.

Figure 2:
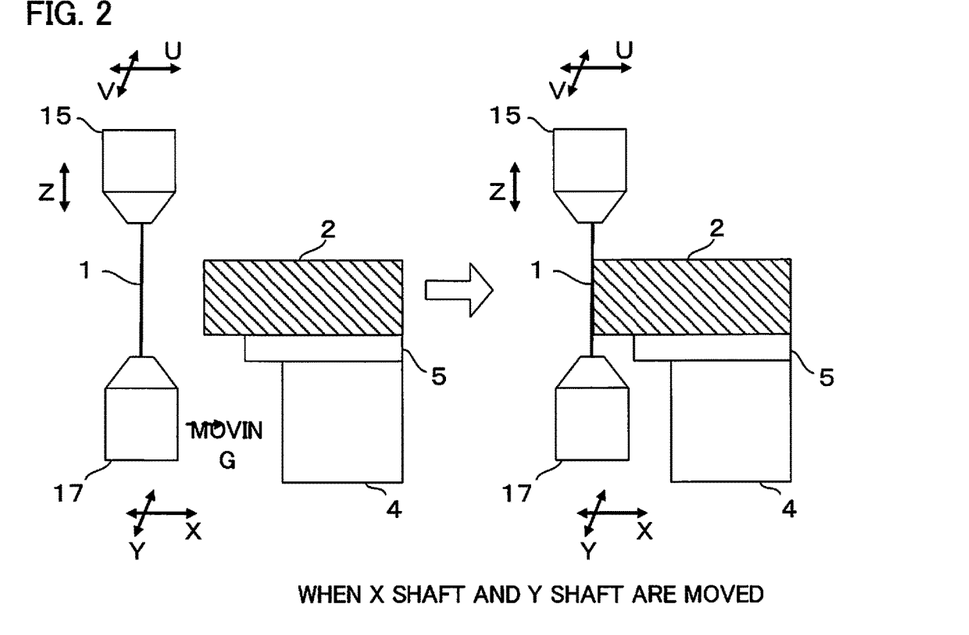
FIG. 2 is a diagram illustrating a control operation for allowing a wire electrode to come into contact with a workpiece by moving an X shaft and a Y shaft.
Figure 3:
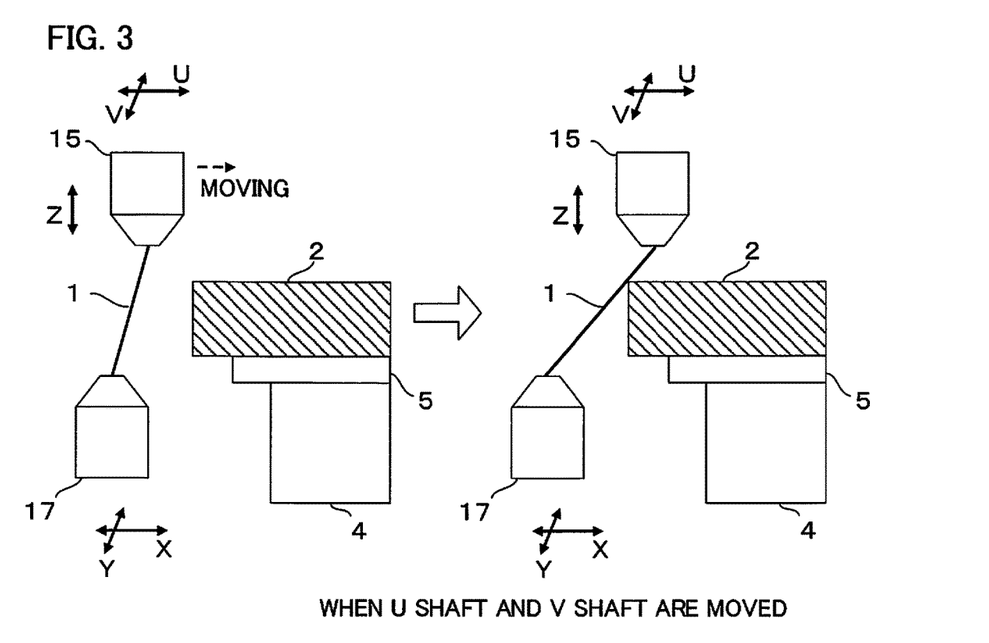
FIG. 3 is a diagram illustrating a control operation for allowing the wire electrode to come into contact with the workpiece by moving a U shaft and a V shaft.

Here, at the time of installing the workpiece 2 on the table 5 and performing wire electrical discharge machining on the workpiece 2, when the wire electric discharge machine allows the wire electrode 1 to come into contact with the workpiece 2 by moving the X shaft and the Y shaft as illustrated in FIG. 2, or when the wire electric discharge machine allows the wire electrode 1 to come into contact with the workpiece 2 by moving the U shaft and the V shaft as illustrated in FIG. 3, the wire electric discharge machine according to the embodiment of the invention determines whether or not electrical discharge machining can be performed by a method of determining whether or not the electrical discharge machining of the workpiece can be performed, which will be described in detail below, and displays a result of the determination on the display unit 51 of the numerical control device 50.

In this embodiment, the wire electric discharge machine appropriately separately uses six methods to be described below or concurrently uses the six methods in order to determine whether or not the electrical discharge machining of the workpiece can be performed.

<1. Method of Determining Whether or not Electrical Discharge Machining can be Performed by Using Voltage Drop of Pulse to be Applied>

A first method, which determines whether or not electrical discharge machining can be performed, of this embodiment is a method of determining whether or not electrical discharge machining can be performed by periodically or always generating pulses of a constant voltage to be applied to the wire electrode and detecting the change of an applied voltage.

Figure 4:
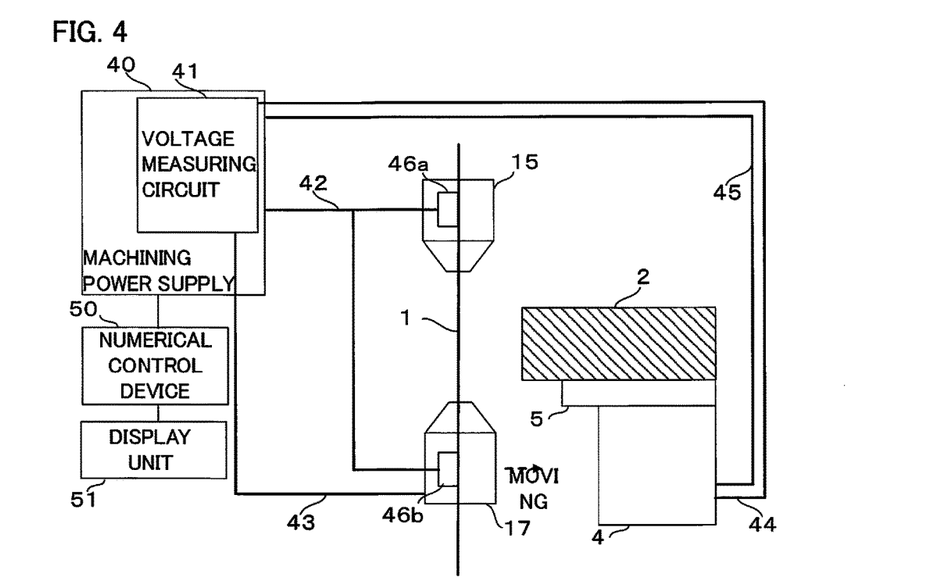
FIG. 4 is a schematic view of the wire electric discharge machine according to the embodiment of the invention that determines whether or not electrical discharge machining can be performed by using an inter-electrode voltage.

FIG. 4 is a schematic view of the wire electric discharge machine 30 that performs this determination method. As illustrated in FIG. 4, power supply elements 46a and 46b are built in the upper and lower guides 15 and 17, respectively. The wire electrode 1 is connected to the machining power supply 40 through a power supply cable 42 connected to the power supply elements 46a and 46b, and the workpiece 2 is connected to the machining power supply 40 through the table 5 and an earth cable 45 connected to the workpiece mount 4. Pulses of a constant voltage to be applied are periodically or always applied to the wire electrode 1 from the machining power supply 40 through the power supply cable 42.

Further, the wire electrode 1 is connected to a voltage measuring circuit 41 of the machining power supply 40 through the lower guide 17 and a voltage detecting cable 43, the workpiece 2 is connected to the voltage measuring circuit 41 of the machining power supply 40 through the workpiece mount 4 (and the table 5) and a voltage detecting cable 44, and the change of a voltage applied between the wire electrode 1 and the workpiece 2 can be measured by the voltage measuring circuit 41. Furthermore, the value of a voltage, which is measured by the voltage measuring circuit 41, is output to the numerical control device 50 as a signal; whether or not electrical discharge machining can be performed is determined on the basis of the output signal; and a result of the determination is displayed on the display unit 51.

Figure 5:
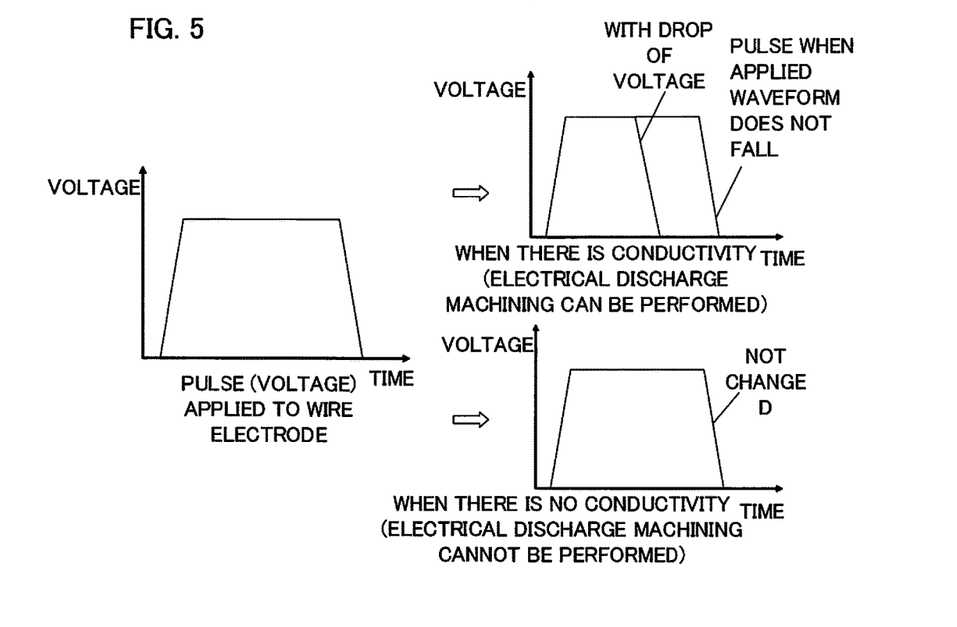
FIG. 5 is a diagram illustrating a method, which determines whether or not electrical discharge machining can be performed by using an inter-electrode voltage, of the embodiment of the invention.

The change of an inter-electrode voltage between the wire electrode 1 and the workpiece 2 is illustrated in graphs of FIG. 5 when pulses to be applied are applied to the wire electrode 1 through the power supply cable 42 and the power supply elements 46a and 46b and the wire electrode 1 is moved so as to come into contact with the workpiece 2 in the wire electric discharge machine 30 having the above-mentioned structure.

When the electrical conductivity of the workpiece 2 is high in a case in which the wire electrode 1 comes into contact with the workpiece 2 while pulses to be applied are applied to the wire electrode 1 as illustrated on the left side in FIG. 5, current flows between the wire electrode 1 and the workpiece 2 by the contact between the wire electrode 1 and the workpiece 2. Accordingly, the drop of an applied voltage is detected as illustrated on the upper right side in FIG. 5.

On the other hand, when the electrical conductivity of the workpiece 2 is low, current does not flow between the wire electrode 1 and the workpiece 2 even though the wire electrode 1 and the workpiece 2 come into contact with each other. Accordingly, the drop of the applied voltage is not detected as illustrated on the lower right side in FIG. 5. Further, when the wire electrode 1 continues to be moved toward the workpiece 2 while the drop of the applied voltage is not detected, the wire electrode 1 cannot withstand stress received from the workpiece 2 and is broken.

If the drop of the applied voltage is detected when the wire electrode 1 is not broken, it is determined that the workpiece 2 is made of a material capable of being subjected to electrical discharge machining. Furthermore, if the drop of the applied voltage is not detected and the wire electrode 1 is broken, it is determined that the electrical discharge machining of the workpiece 2 cannot be performed.

Meanwhile, in FIG. 4, the wire electric discharge machine has been adapted to apply voltage pulses by the machining power supply 40 and to detect the drop of the applied voltage by the voltage measuring circuit 41 of the machining power supply 40. However, the wire electric discharge machine may be adapted to use a device, which generates pulses to be applied, as a dedicated device for applying voltage pulses and may be adapted to use a dedicated voltage measuring device for the measurement of a voltage. Further, the wire electric discharge machine has been adapted to prepare the dedicated voltage detecting cables 43 and 44 for the detection of the drop of the applied voltage, but may be adapted to detect the drop of the applied voltage between the power supply cable 42, which applies voltage pulses, and the earth cable 45. Furthermore, the wire electric discharge machine may be adapted so that a threshold of the drop of the applied voltage to be detected can be set in the numerical control device 50.

<2. Method of Determining Whether or not Electrical Discharge Machining can be Performed by Using Detection of Current>

A second method, which determines whether or not electrical discharge machining can be performed, of this embodiment is a method of determining whether or not electrical discharge machining can be performed by generating pulses of a constant voltage to be applied to the wire electrode and detecting the flow of current.

Figure 6:
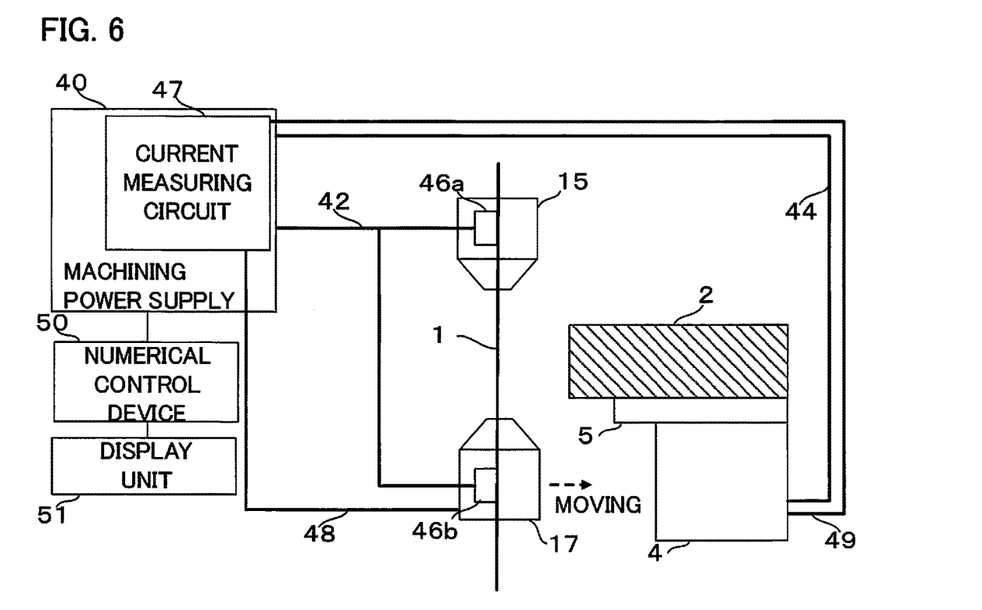
FIG. 6 is a schematic view of the wire electric discharge machine according to the embodiment of the invention that determines whether or not electrical discharge machining can be performed by using inter-electrode current.

FIG. 6 is a schematic view of the wire electric discharge machine 30 that performs this determination method. As illustrated in FIG. 6, the power supply elements 46a and 46b are built in the upper and lower guides 15 and 17, respectively. The wire electrode 1 is connected to the machining power supply 40 through a power supply cable 42 connected to the power supply elements 46a and 46b, and the workpiece 2 is connected to the machining power supply 40 through the table 5 and the earth cable 45 connected to the workpiece mount 4. Pulses of a constant voltage to be applied to the wire electrode 1 through the power supply cable 42 are generated from the machining power supply 40.

Further, the wire electrode 1 is connected to a current measuring circuit 47 of the machining power supply 40 through the lower guide 17 and a current detecting cable 48, the workpiece 2 is connected to the current measuring circuit 47 of the machining power supply 40 through the workpiece mount 4 (and the table 5) and a current detecting cable 49, current flowing between the wire electrode 1 and the workpiece 2 can be measured by the current measuring circuit 47. Furthermore, the value of current, which is measured by the current measuring circuit 47, is output to the numerical control device 50 as a signal; whether or not electrical discharge machining can be performed is determined on the basis of the output signal; and a result of the determination is displayed on the display unit 51.

Figure 7:
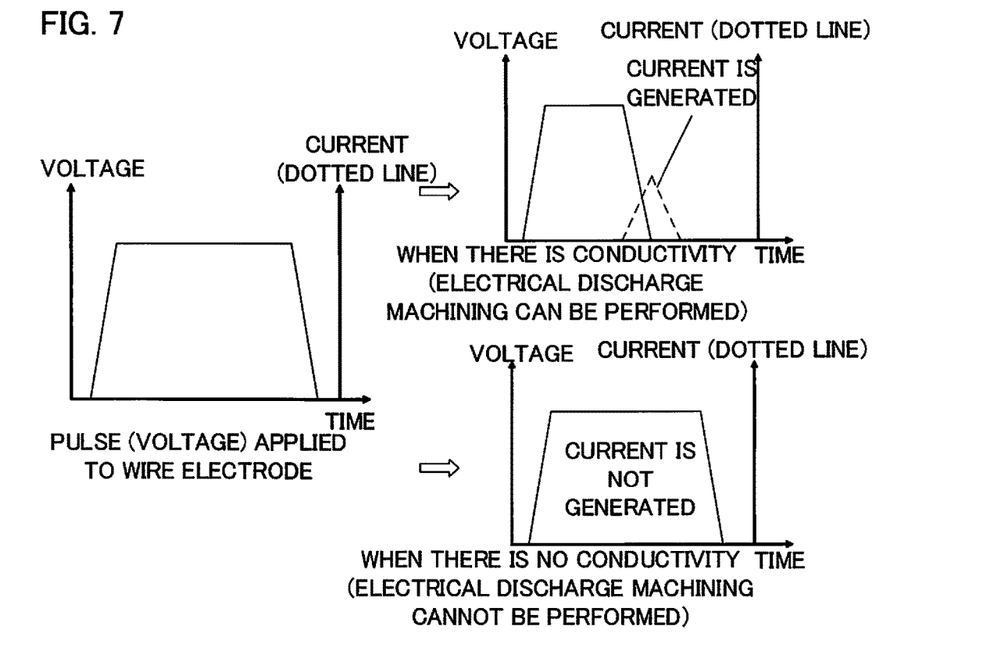
FIG. 7 is a diagram illustrating a method, which determines whether or not electrical discharge machining can be performed by using inter-electrode current, of the embodiment of the invention.

The changes of an inter-electrode voltage and inter-electrode current between the wire electrode 1 and the workpiece 2 are illustrated in graphs of FIG. 7 when pulses to be applied are applied to the wire electrode 1 through the power supply cable 42 and the power supply elements 46a and 46b and the wire electrode 1 is moved so as to come into contact with the workpiece 2 in the wire electric discharge machine 30 having the above-mentioned structure.

When the electrical conductivity of the workpiece 2 is high in a case in which the wire electrode 1 comes into contact with the workpiece 2 while pulses to be applied are applied to the wire electrode 1 as illustrated in a left graph of FIG. 7, current is detected between the wire electrode 1 and the workpiece 2 as illustrated on the upper right side in FIG. 7 by the contact between the wire electrode 1 and the workpiece 2.

On the other hand, when the electrical conductivity of the workpiece 2 is low, current is not detected between the wire electrode 1 and the workpiece 2 as illustrated on the lower right side in FIG. 7 even though the wire electrode 1 and the workpiece 2 come into contact with each other. Further, when the wire electrode 1 continues to be moved toward the workpiece 2 while current is not detected, the wire electrode 1 cannot withstand stress received from the workpiece 2 and is broken.

If current is detected between the wire electrode 1 and the workpiece 2 when the wire electrode 1 is not broken, it is determined that the workpiece 2 is made of a material capable of being subjected to electrical discharge machining. Furthermore, if current is not detected and the wire electrode 1 is broken, it is determined that the electrical discharge machining of the workpiece 2 cannot be performed.

Meanwhile, in FIG. 6, the wire electric discharge machine has been adapted to apply pulses to be applied by the machining power supply 40 and to detect inter-electrode current between the wire electrode 1 and the workpiece 2 by the current measuring circuit 47 of the machining power supply 40. However, the wire electric discharge machine may be adapted to use a device, which generates pulses to be applied, as a dedicated device for applying pulses to be applied and may be adapted to use a dedicated current measuring device for the measurement of current. Further, the wire electric discharge machine has been adapted to prepare the dedicated current detecting cables 48 and 49 for the detection of the inter-electrode current between the wire electrode 1 and the workpiece 2, but may be adapted to detect the inter-electrode current between the power supply cable 42, which applies voltage pulses, and the earth cable 45. Furthermore, the wire electric discharge machine may be adapted so that a threshold of the inter-electrode current to be detected can be set in the numerical control device 50.

<3. Method of Determining Whether or not Electrical Discharge Machining can be Performed by Using the Rise of Pulse to be Applied>

A third method, which determines whether or not electrical discharge machining can be performed, of this embodiment is a method of determining whether or not electrical discharge machining can be performed by periodically generating pulses of a constant voltage to be applied to the wire electrode 1 and detecting the rise of an applied voltage.

Figure 8:
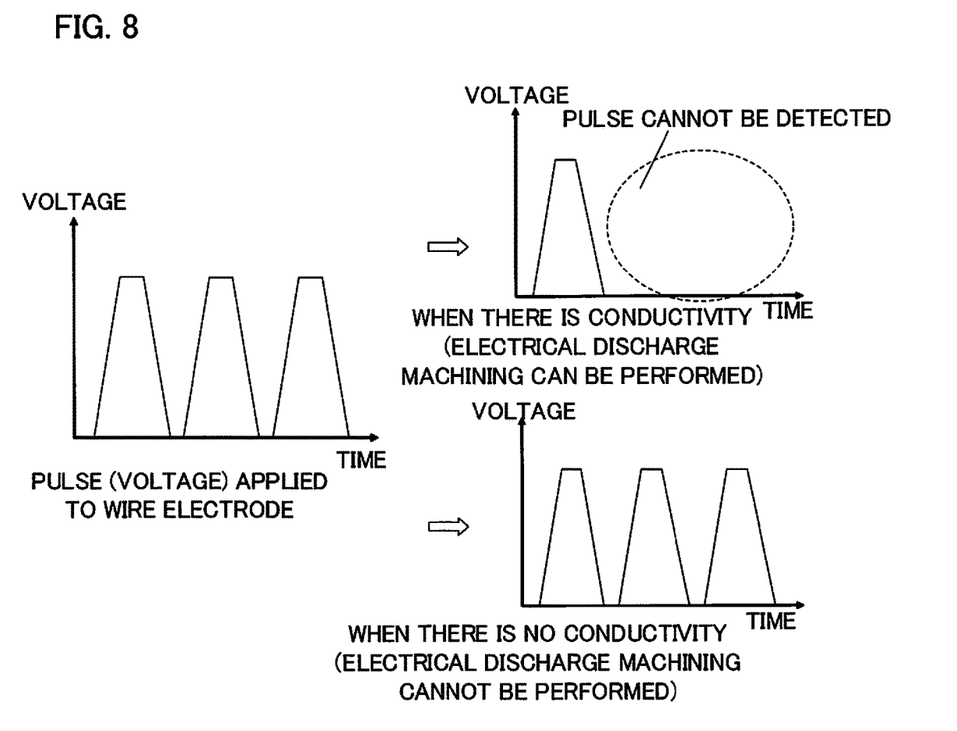
FIG. 8 is a diagram illustrating a method, which determines whether or not electrical discharge machining can be performed by using an inter-electrode voltage using pulses to be applied, of the embodiment of the invention.

The change of an inter-electrode voltage between the wire electrode 1 and the workpiece 2 is illustrated in graphs of FIG. 8 when periodic pulses to be applied are applied to the wire electrode 1 through the power supply cable 42 and the power supply elements 46a and 46b and the wire electrode 1 is moved so as to come into contact with the workpiece 2 in the wire electric discharge machine 30 having the same structure as FIG. 4.

When the electrical conductivity of the workpiece 2 is high in a case in which the wire electrode 1 comes into contact with the workpiece 2 while periodic pulses to be applied are applied to the wire electrode 1 as illustrated on the left side in FIG. 8, current flows between the wire electrode 1 and the workpiece 2 by the contact between the wire electrode 1 and the workpiece 2. Accordingly, the rise of the voltage of the periodic applied pulses cannot be detected as illustrated on the upper right in FIG. 8.

On the other hand, when the electrical conductivity of the workpiece 2 is low, current does not flow between the wire electrode 1 and the workpiece 2 even though the wire electrode 1 and the workpiece 2 come into contact with each other. Accordingly, the rises of voltages of periodic applied pulses continue to be detected as illustrated on the lower right side in FIG. 8. Further, when the wire electrode 1 continues to be moved toward the workpiece 2 while the state of the rise of a voltage of a pulse to be applied does not change, the wire electrode 1 cannot withstand stress received from the workpiece 2 and is broken.

Meanwhile, in FIG. 4, the wire electric discharge machine has been adapted to apply voltage pulses by the machining power supply 40 and to detect the drop of the applied voltage by the voltage measuring circuit 41 of the machining power supply 40. However, the wire electric discharge machine may be adapted to use a device, which generates pulses to be applied, as a dedicated device for applying voltage pulses and may be adapted to use a dedicated voltage measuring device for the measurement of a voltage. Further, the wire electric discharge machine has been adapted to prepare the dedicated voltage detecting cables 43 and 44 for the detection of the drop of the applied voltage, but may be adapted to detect the drop of the applied voltage between the power supply cable 42, which applies voltage pulses, and the earth cable 45. Furthermore, the wire electric discharge machine may be adapted so that a threshold of the drop of the applied voltage to be detected can be set in the numerical control device 50.

<4. Method of Determining Whether or not Electrical Discharge Machining can be Performed by Using the Change of Tension of the Wire Electrode>

A fourth method, which determines whether or not electrical discharge machining can be performed, of this embodiment is a method of determining whether or not electrical discharge machining can be performed by detecting the tension that is generated on the wire electrode. This determination method is a method that is used together with the first to third methods of determining whether or not electrical discharge machining can be performed. This determination method is a method of detecting the contact between the wire electrode and the workpiece by the tension generated on the wire electrode and determining whether or not the electrical discharge machining of the workpiece can be performed, when the changes of an inter-electrode voltage and inter-electrode current are not detected by the first to third methods, which determine whether or not electrical discharge machining can be performed, in a case in which the wire electrode is moved toward the workpiece while pulses of a constant voltage to be applied to the wire electrode are periodically or always generated.

Figure 9:
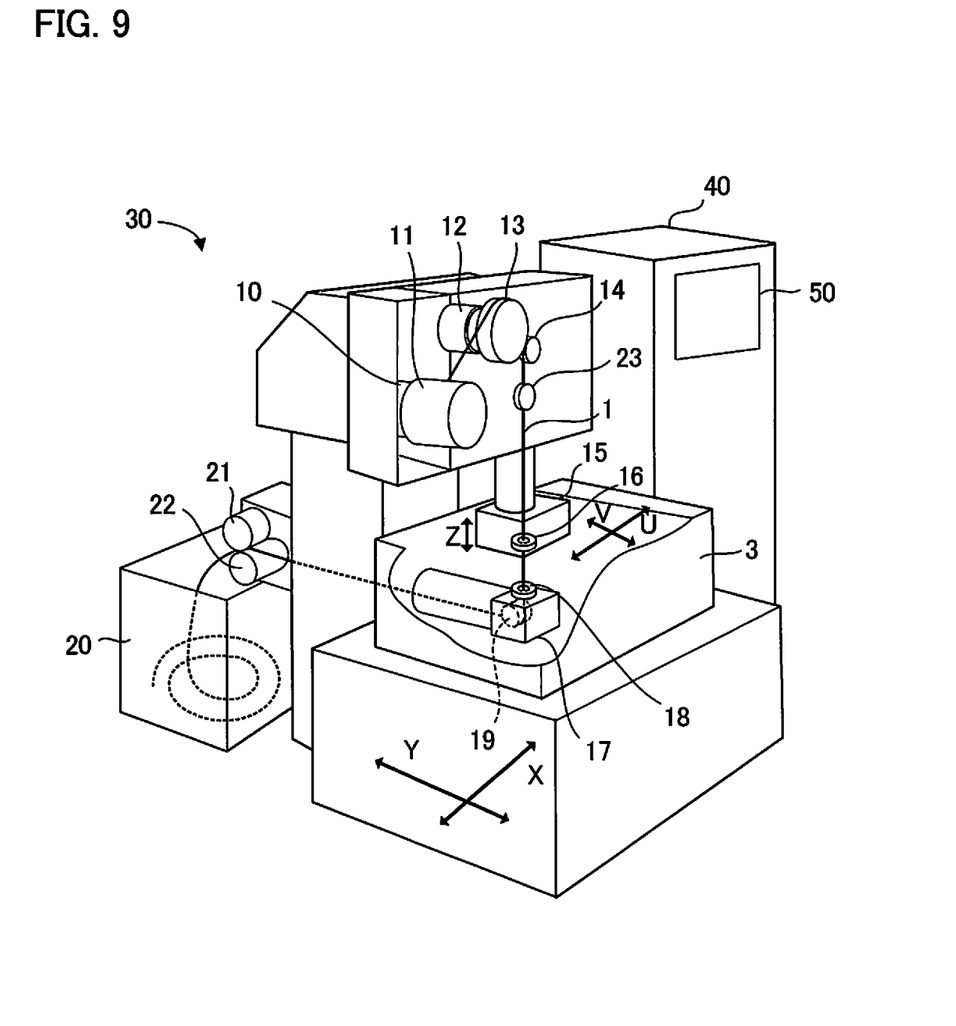
FIG. 9 is a schematic diagram illustrating the structure of the wire electric discharge machine according to the embodiment of the invention that includes a tension detector.

This determination method is performed in a wire electric discharge machine including a general wire drive unit. As illustrated in FIG. 9, the general wire drive unit includes: a brake roller 13 and a pinch roller 14 that generate tension on the wire electrode 1 by the power of an actuator, such as a sending unit-torque motor 10 sending the wire electrode 1 or a brake motor 12; a feed roller 22 and a pinch roller 21 that send the wire electrode 1 by the power of an actuator, such as a wire electrode feed motor (not illustrated); and a tension detector 23 that detects the tension of the wire electrode 1.

Figure 10:
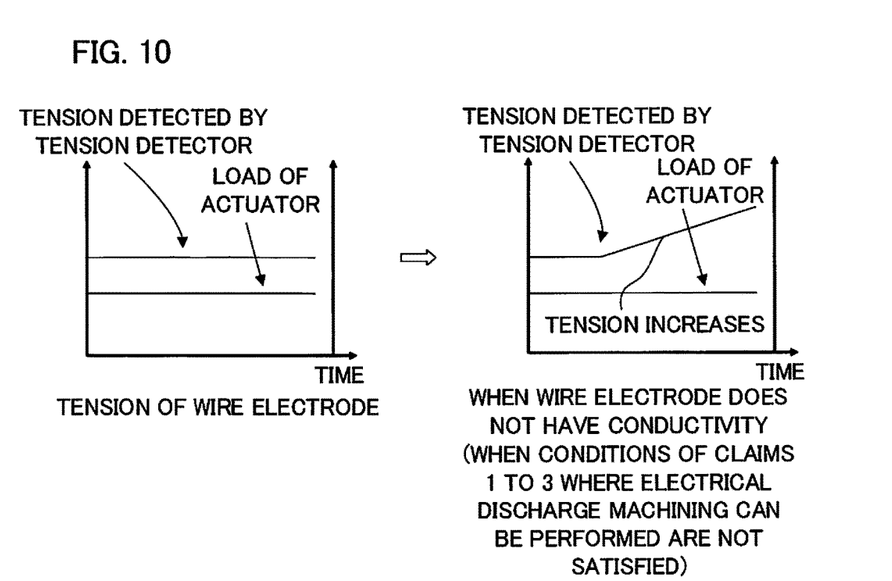
FIG. 10 is a diagram illustrating a method, which determines whether or not electrical discharge machining can be performed by using tension of the wire electrode, of the embodiment of the invention.

The change of the tension of the wire electrode 1 is illustrated in graphs of FIG. 10 when the wire electrode 1 is moved toward the workpiece 2 while pulses to be applied are applied to the wire electrode 1 for the first to third methods, which determine whether or not electrical discharge machining can be performed, after constant tension is generated on the wire electrode 1 through the brake roller 13 by the power of an actuator, such as the sending unit-torque motor 10 or the brake motor 12 in the wire electric discharge machine 30 having this structure.

When the wire electrode 1 comes into contact with the workpiece 2 having low electrical conductivity while the tension illustrated in the left graph of FIG. 10 is applied to the wire electrode 1, the wire electrode 1 bites into the workpiece 2 and is bent without the determination of whether or not electrical discharge machining can be performed by the first to third methods of determining whether or not electrical discharge machining can be performed. Accordingly, the tension detected by the tension detector is increased as illustrated in the right graph of FIG. 10. In this case, if the tension exceeds a predetermined threshold, it is determined that the electrical discharge machining of the workpiece 2 cannot be performed.

<5. Method of Determining Whether or not Electrical Discharge Machining can be Performed by Using the Change of Load of Tension Generator for Wire Electrode>

A fifth method, which determines whether or not electrical discharge machining can be performed, of this embodiment is a method of determining whether or not electrical discharge machining can be performed by detecting a load, which is generated in a tension generator such as a sending unit-torque motor, when constant tension is maintained on the wire electrode. This determination method is used together with the first to third methods of determining whether or not electrical discharge machining can be performed, like the fourth method of determining whether or not electrical discharge machining is avoided.

Figure 11:
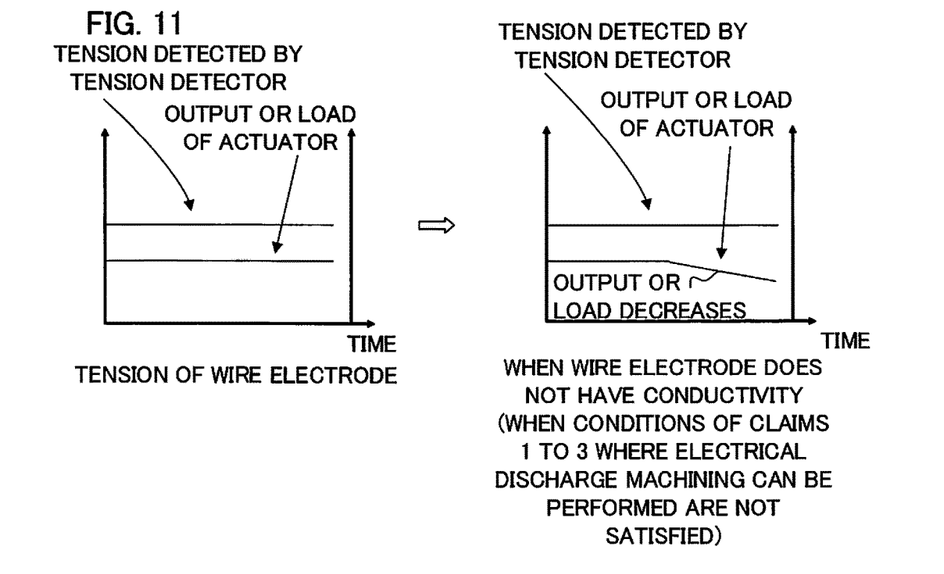
FIG. 11 is a diagram illustrating a method, which determines whether or not electrical discharge machining can be performed by using a load of a tension generator, of the embodiment of the invention.

The change of a load of the tension generator, such as the sending unit-torque motor 10, is illustrated in graphs of FIG. 11 when the wire electrode 1 is moved toward the workpiece 2 while pulses to be applied are applied to the wire electrode 1 for the first to third methods, which determine whether or not electrical discharge machining can be performed, after tension is generated on the wire electrode 1 through the brake roller 13 by the power of an actuator, such as the sending unit-torque motor 10 or the brake motor 12, so that the tension detected by the tension detector 23 becomes constant, in the wire electric discharge machine 30 having the same structure as FIG. 9.

When tension illustrated in the left graph of FIG. 11 is applied to the wire electrode 1 and the wire electrode 1 comes into contact with the workpiece 2 having low electrical conductivity while the tension generator is controlled so that the same tension is maintained, the wire electrode 1 bites into the workpiece 2 and is bent without the determination of whether or not electrical discharge machining can be performed by the first to third methods of determining whether or not electrical discharge machining can be performed. Accordingly, the load of the tension generator is reduced as illustrated in the right graph of FIG. 11. In this case, if the load of the tension generator is smaller than a predetermined threshold, it is determined that the electrical discharge machining of the workpiece 2 cannot be performed.

<6. Method of Determining Whether or not Electrical Discharge Machining can be Performed by Using the Breaking of Wire Electrode>

A sixth method, which determines whether or not electrical discharge machining can be performed, of this embodiment is a method of determining whether or not electrical discharge machining can be performed by detecting the breaking of the wire electrode when the wire electrode is moved toward the workpiece while tension is generated on the wire electrode. This determination method is used together with the first to third methods of determining whether or not electrical discharge machining can be performed, like the fourth and fifth methods of determining whether or not electrical discharge machining can be performed.

In this determination method, the wire electrode 1 is moved toward the workpiece 2 while pulses to be applied are applied to the wire electrode 1 for the first to third methods, which determine whether or not electrical discharge machining can be performed, after tension illustrated on the left side in FIG. 11 is generated on the wire electrode 1 through the brake roller 13 by the power of an actuator, such as the sending unit-torque motor 10 or the brake motor 12, in the wire electric discharge machine 30 having the same structure as FIG. 9.

Further, when the wire electrode 1 comes into contact with the workpiece 2 having low electrical conductivity, the wire electrode 1 bites into the workpiece 2 and is bent without the determination of whether or not electrical discharge machining can be performed by the first to third methods for determining whether or not electrical discharge machining can be performed. When stress exceeds allowable shearing stress, the wire electrode 1 is broken. When the breaking of the wire electrode 1 is detected, it is determined that the electrical discharge machining of the workpiece 2 cannot be performed.

Meanwhile, when a contact point between the wire electrode 1 and the workpiece 2 is determined, such as when the position and the shape of the workpiece are set in the numerical control device 50 or the like, whether or not electrical discharge machining can be performed can be determined by only the first to third methods of determining whether or not electrical discharge machining can be performed.

Furthermore, when the contact point between the wire electrode 1 and the workpiece 2 is not determined, whether or not the wire electrode 1 is moved in front of the workpiece 2 or whether or nor the wire electrode 1 bites into the workpiece 2 cannot be determined by only the first to third methods of determining whether or not electrical discharge machining can be performed. Accordingly, the fourth to sixth methods of determining whether or not electrical discharge machining can be performed are used concurrently to determine whether or not electrical discharge machining can be performed.

Figure 12:
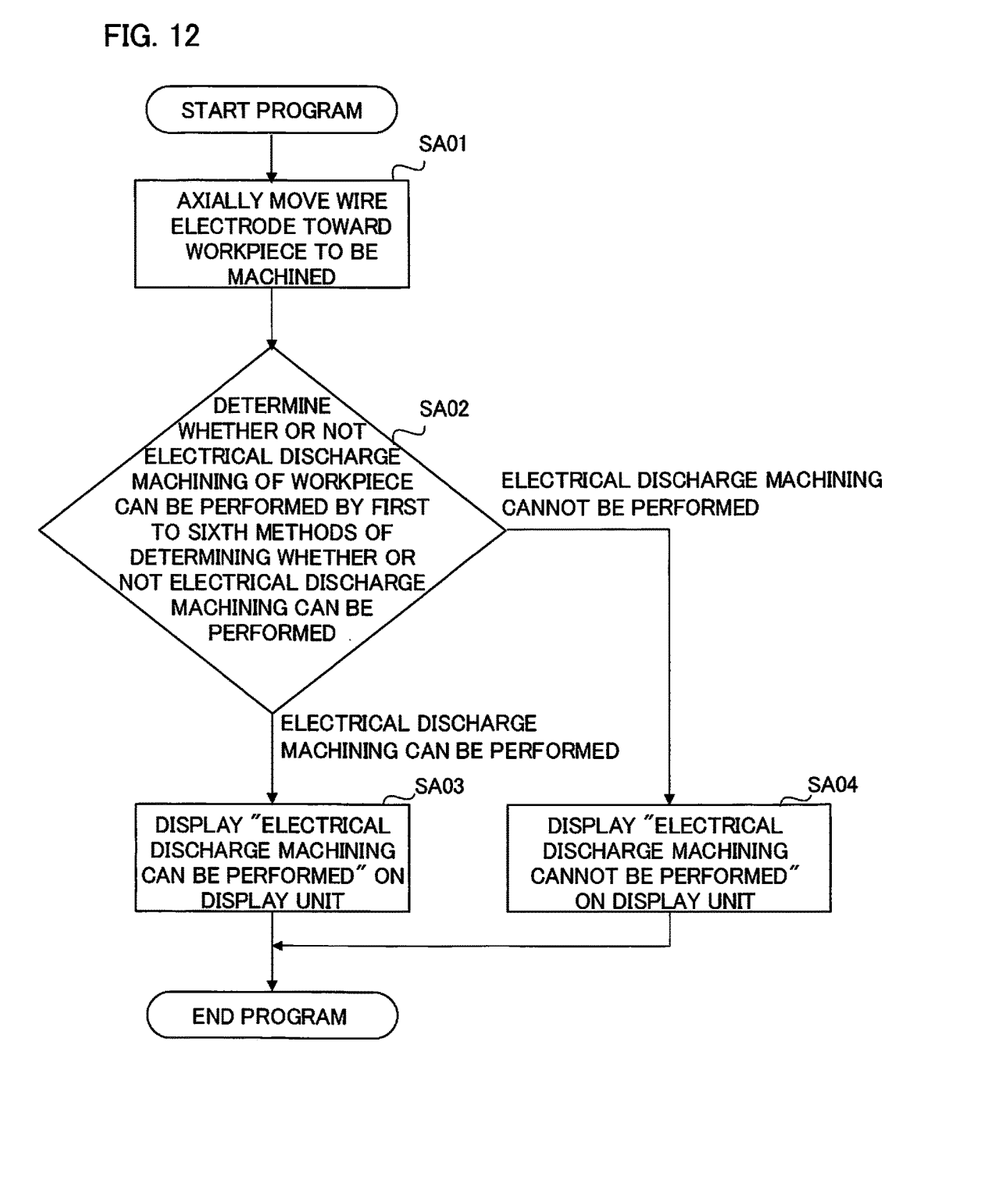
FIG. 12 is a flowchart of sequence, which determines whether or not wire electrical discharge machining can be performed, of the embodiment of the invention.

FIG. 12 is a flowchart of control processing, which determines whether or not wire electrical discharge machining can be performed, performed by the numerical control device 50 using the first to sixth methods of determining whether or not electrical discharge machining can be performed. The processing of this flowchart is commanded and performed by a user's operation of a control panel, a machining program, or the like.

[Step SA01] When the start of sequence for determining whether or not wire electrical discharge machining can be performed is commanded, the wire electrode is axially moved toward the workpiece as an object to be machined.

[Step SA02] The first to sixth methods of determining whether or not electrical discharge machining can be performed are combined and applied as occasion demands, and it is determined whether or not the electrical discharge machining of the workpiece as an object to be machined can be performed. If the electrical discharge machining of the workpiece can be performed, the processing proceeds to Step SA03. If the electrical discharge machining of the workpiece cannot be performed, the processing proceeds to Step SA04.

[Step SA03] The display unit displays that "the electrical discharge machining of the workpiece can be performed".

[Step SA04] The display unit displays that "the electrical discharge machining of the workpiece cannot be performed".

The invention claimed is:

1. A wire electric discharge machine configured to perform wire electrical discharge machining while moving a wire electrode, which is stretched between upper and lower wire guides, relative to a table on which a workpiece is placed and determine whether or not electrical discharge machining of the workpiece can be performed, the wire electric discharge machine comprising:
   a contact detection device configured to detect the contact between the wire electrode and the workpiece by applying a predetermined voltage to the wire electrode; and
   a numerical control device configured to:
      control operations of the wire electric discharge machine,
      detect the breaking of the wire electrode,
      determine that wire electrical discharge machining of the workpiece can be performed when the wire electrode is moved toward the workpiece and the contact detection device detects the contact,
when the breaking of the wire electrode is not detected, and
when the contact detection device detects
a drop of voltage applied to the wire electrode, or
a current flowing between the wire electrode and the workpiece, and
determine that the wire electrical discharge machining of the workpiece cannot be performed when the breaking of the wire electrode is detected before the contact detection device detects the contact; and
display a result of the determination.

2. The wire electric discharge machine, which determines whether or not electrical discharge machining of the workpiece can be performed, according to claim 1,
wherein the contact detection device is further configured to detect the contact between the wire electrode and the workpiece by detecting the change of a potential difference between the wire electrode and the workpiece.

3. The wire electric discharge machine, which determines whether or not electrical discharge machining of the workpiece can be performed, according to claim 1,
wherein the contact detection device is further configured to detect the contact between the wire electrode and the workpiece by detecting current flowing between the wire electrode and the workpiece.

4. The wire electric discharge machine according to claim 1,
wherein the contact detection device comprises:
a machining power supply source; and
a current measuring circuit configured to measure the current flowing between the wire electrode and the workpiece when the contact detection device detects the contact.

5. The wire electric discharge machine according to claim 4, wherein the current measuring circuit is a part of the machining power supply source.

6. The wire electric discharge machine according to claim 1,
wherein the contact detection device comprises:
a machining power supply source; and
a voltage measuring circuit configured to measure the voltage and the drop of the voltage applied to the wire electrode when the contact detection device detects the contact between the wire electrode and the workpiece.

7. The wire electric discharge machine according to claim 6, wherein the voltage measuring circuit is a part of the machining power supply source.

8. The wire electric discharge machine according to claim 6, wherein the predetermined voltage is applied between
a voltage detection cable separate from a power supply cable connecting the machining power supply source to the wire electrode and
an earth cable.

9. The wire electric discharge machine according to claim 6, wherein the predetermined voltage is applied between
a power supply cable connecting the machining power supply source to the wire electrode and
an earth cable.

10. The wire electric discharge machine according to claim 9, wherein the power supply cable is configured to flow the current to the earth cable when the predetermined voltage is applied.

11. The wire electric discharge machine according to claim 9, further comprising a current detection cable separate from the power supply cable, wherein the current detection cable is configured to flow the current to the earth cable when the predetermined voltage is applied.

12. A wire electric discharge machine configured to perform wire electrical discharge machining while moving a wire electrode, which is stretched between upper and lower wire guides, relative to a table on which a workpiece is placed and determine whether or not electrical discharge machining of the workpiece can be performed, the wire electric discharge machine comprising:
a contact detection device configured to detect the contact between the wire electrode and the workpiece by applying a predetermined voltage to the wire electrode;
a wire tension detector configured to detect the tension of the wire electrode; and
a numerical control device configured to
control operations of the wire electric discharge machine,
determine that wire electrical discharge machining of the workpiece can be performed
when the wire electrode is moved toward the workpiece and the contact detection device detects the contact, and
when the contact detection device detects no tension exceeding a predetermined threshold for predetermined time period, and
determine that the wire electrical discharge machining of the workpiece cannot be performed when the wire tension detector detects tension exceeding a predetermined threshold before the contact detection device detects the contact; and
display a result of the determination.

13. The wire electric discharge machine, which determines whether or not electrical discharge machining of the workpiece can be performed, according to claim 12,
wherein the contact detection device is further configured to detect the contact between the wire electrode and the workpiece by detecting the change of a potential difference between the wire electrode and the workpiece.

14. The wire electric discharge machine, which determines whether or not electrical discharge machining of the workpiece can be performed, according to claim 12,
wherein the contact detection device is further configured to detect the contact between the wire electrode and the workpiece by detecting current flowing between the wire electrode and the workpiece.

15. The wire electric discharge machine according to claim 12,
wherein the contact detection device comprises:
a machining power supply source; and
a voltage measuring circuit configured to measure the voltage and the drop of the voltage applied to the wire electrode when the contact detection device detects the contact between the wire electrode and the workpiece.

16. The wire electric discharge machine according to claim 15, wherein the voltage measuring circuit is a part of the machining power supply source.

17. The wire electric discharge machine according to claim 12,
wherein the contact detection device comprises:
a machining power supply source; and
a current measuring circuit configured to measure the current flowing between the wire electrode and the workpiece when the contact detection device detects the contact.

18. The wire electric discharge machine according to claim 17, wherein the current measuring circuit is a part of the machining power supply source.

* * * * *